United States Patent [19]
Heidrich

[11] 3,811,658
[45] May 21, 1974

[54] EXTRUDER FOR PROCESSING PLASTICS AND RUBBER

[76] Inventor: Horst Heidrich, Hochbergweg 19, 792 Heidenheim-Brenz, Germany

[22] Filed: Jan. 22, 1973

[21] Appl. No.: 325,335

[30] Foreign Application Priority Data
Jan. 24, 1972 Germany............................ 2203759
Jan. 24, 1972 Germany............................ 2203760

[52] U.S. Cl.................................. 259/191, 277/67
[51] Int. Cl............................................. B01f 7/02
[58] Field of Search......... 259/191, 192, 193, 9, 10, 259/25, 26, 45, 46, 109, 110; 277/67

[56] References Cited
UNITED STATES PATENTS
| | | | |
|---|---|---|---|
| 3,375,549 | 4/1968 | Geyer | 259/192 |
| 3,700,247 | 10/1972 | Butler | 277/67 |
| 3,727,892 | 4/1973 | Notte | 259/191 |
| 3,746,350 | 6/1973 | Mayer | 277/67 |

Primary Examiner—Robert W. Jenkins

[57] ABSTRACT

An extruder provided with an intermediate chamber between the screw cylinder and the gear drive unit with the screw shaft extending through the chamber to a vacuum sealed driving connection to the gear drive unit, and with the intermediate chamber communicating with the screw cylinder and hopper bore by a small annular clearance between the screw shaft and the cylinder wall. The usual shaft seals are eliminated and are instead installed at the end of the intermediate chamber adjacent the gear drive unit and avoids seal contamination while making possible seal lubrication. When additives are employed, the tight seal off of the intermediate chamber from the gear drive unit is assured by using seals designed to correspond to the properties of the additive to be processed. The intermediate chamber is provided with a pressure line connection to an apparatus for supplying liquid or gaseous additives which can be introduced and quantitatively metered at the beginning of the screw to thereby accomplish uniform conveying of the additive over the circumference of the screw to make the entire length of the screw available for mixing the additive with the plastic. The intermediate chamber may alternatively be provided with a vacuum line connection for degasifying the feed from the supply hopper while minimizing suction in the screw cylinder toward the ejection end of the screw.

9 Claims, 3 Drawing Figures

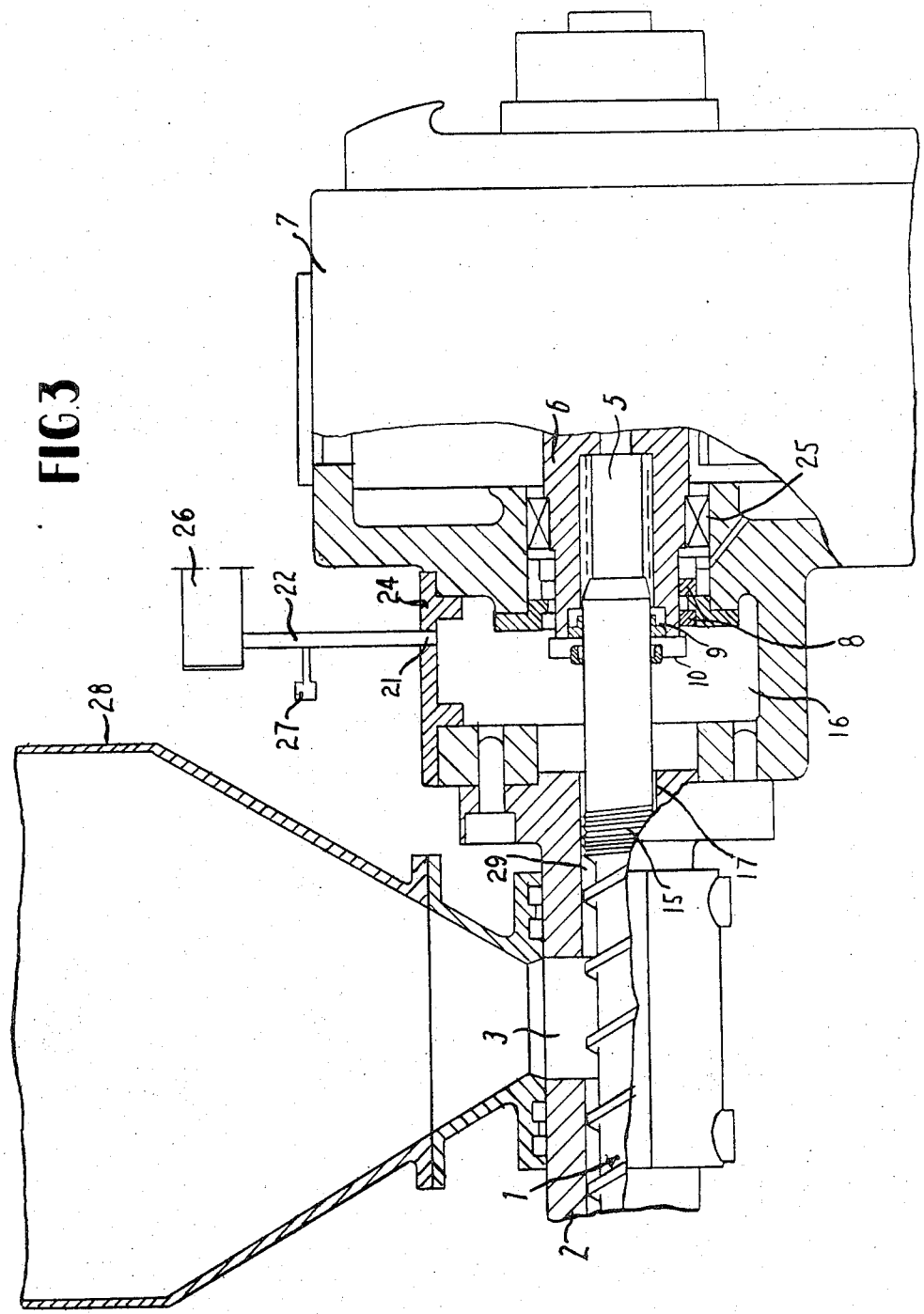

EXTRUDER FOR PROCESSING PLASTICS AND RUBBER

This invention relates to extruders for processing plastics and rubber, and more particularly relates to venting and pressurizing systems for processing plastics and rubber under either vacuum or pressure. The processing of plastics and under vacuum can provide remarkable improvements in quality by removing atmospheric oxygen and humidity which frequently have a harmful effect on these materials. The pressurizing system provides superior mixing of colorants and foaming agents with the plastics being extruded. The structure according to the invention, whether used in a vacuum or a pressurized system, prevents damage to the screw shaft seals and minimizes extruder down-time.

Considering first the venting system, in existing systems of this type, venting of the feed occurs in a closed hopper which is connected to a vacuum pump, and after the feed is loaded, the hopper is evacuated. The influence of the vacuum is not limited only to the hopper but spreads to the screw, part of the cylinder space, and to the melted plastic because the screw is sealed toward its driven end at the gear unit. The seals and radial shaft packing rings (gaskets) cannot be lubricated and consequently are operated dry because the lubricant will contaminate the plastic. The radial shaft gaskets are exposed to a high rate of wear by this dry operation and cause a high incidence of troubles on the extruder and loss of working time due to frequent changes of the packing gaskets. When the screw is removed, plastic residues are pushed backward and settle between the gaskets and the packing lips on the screw shaft, so that the sealing surface no longer provides sufficient sealing and must be cleaned.

Additionally, the invention is also concerned with the addition of colorants and foaming agents during the processing of plastics and provides for supply ducts through which colorants and foaming agents are conveyed to the cylinder. A thorough mixing of the additives with the plastics is obtained when the additives are included early in the plastic, so that the entire length of the screw in the cylinder is available to mix and melt the plastic. However, with known constructions of extruders the addition of additives at the region of the hopper can cause these additives to reach the lateral gear seals on the screw driving shaft with consequent contamination of the seals. An occasional forced feeding of additives to the plastic material will cause the additive to reach the seals and can lead to premature damage of the seals.

The invention eliminates the aforementioned problems by providing an intermediate chamber between the screw cylinder and the gear drive unit with the screw shaft extending through the chamber to a vacuum sealed driving connection to the gear drive unit, and with the intermediate chamber communicating with the screw cylinder and hopper bore by a small annular clearance between the screw shaft and the cylinder wall, and by providing the intermediate chamber with a terminal connection to either a vacuum exhaust or a pressurized feed. At the same time, the usual shaft seals are eliminated and are instead installed at the end of the intermediate chamber adjacent the gear drive unit and consequently out of the region where seal contamination is possible. Lubrication of the seals in this new position is possible and cannot have any adverse effect on the materials being processed because the vapors containing oil which may possibly escape will either be evacuated by the vacuum main connected with the intermediate chamber or will tend to migrate in the opposite direction toward the gear unit if the intermediate chamber is pressurized. In neither case can the vapors reach the material being extruded. When additives are employed, the tight seal off of the intermediate chamber from the gear drive unit is assured by using seals especially designed to correspond to the properties of the additive to be processed.

The invention eliminates the disadvantages mentioned above for hopper venting during the degasification of the feed by preventing the suction of air in the screw area since the suction is now drawn in the opposite direction through the intermediate chamber.

It is a primary object of the invention to provide an extruder having an intermediate chamber located between the gear drive unit and the cylinder containing the screw, the chamber being sealed off from the gear drive unit and being in open communication with the screw through a narrow annular clearance between the screw shaft and the cylinder wall to thereby increase screw shaft seal life.

Another object of the invention is to provide an extruder as aforesaid in which the intermediate chamber has a pressure line connection to an apparatus for supplying liquid or gaseous additives which can be introduced and quantitatively metered at the beginning of the screw to thereby accomplish the uniform conveying of the additive over the circumference of the screw and, as a result, make the entire length of the screw available for mixing the additive with the plastic.

Another object of the invention is to provide an extruder as aforesaid in which the intermediate chamber has a vacuum line connection for degasifying the feed from the supply hopper while minimizing suction in the screw cylinder toward the ejection end of the screw.

The foregoing and other objects of the invention will appear more fully hereinafter from a reading of the specification, in conjunction with an examination of the appended drawings, wherein:

FIG. 3 is a showing similar to that of FIG. 1 but in which the apparatus is adapted for inserting additives to the material being extruded.

In the several figures, like elements are designated by like reference characters.

Figure 1:
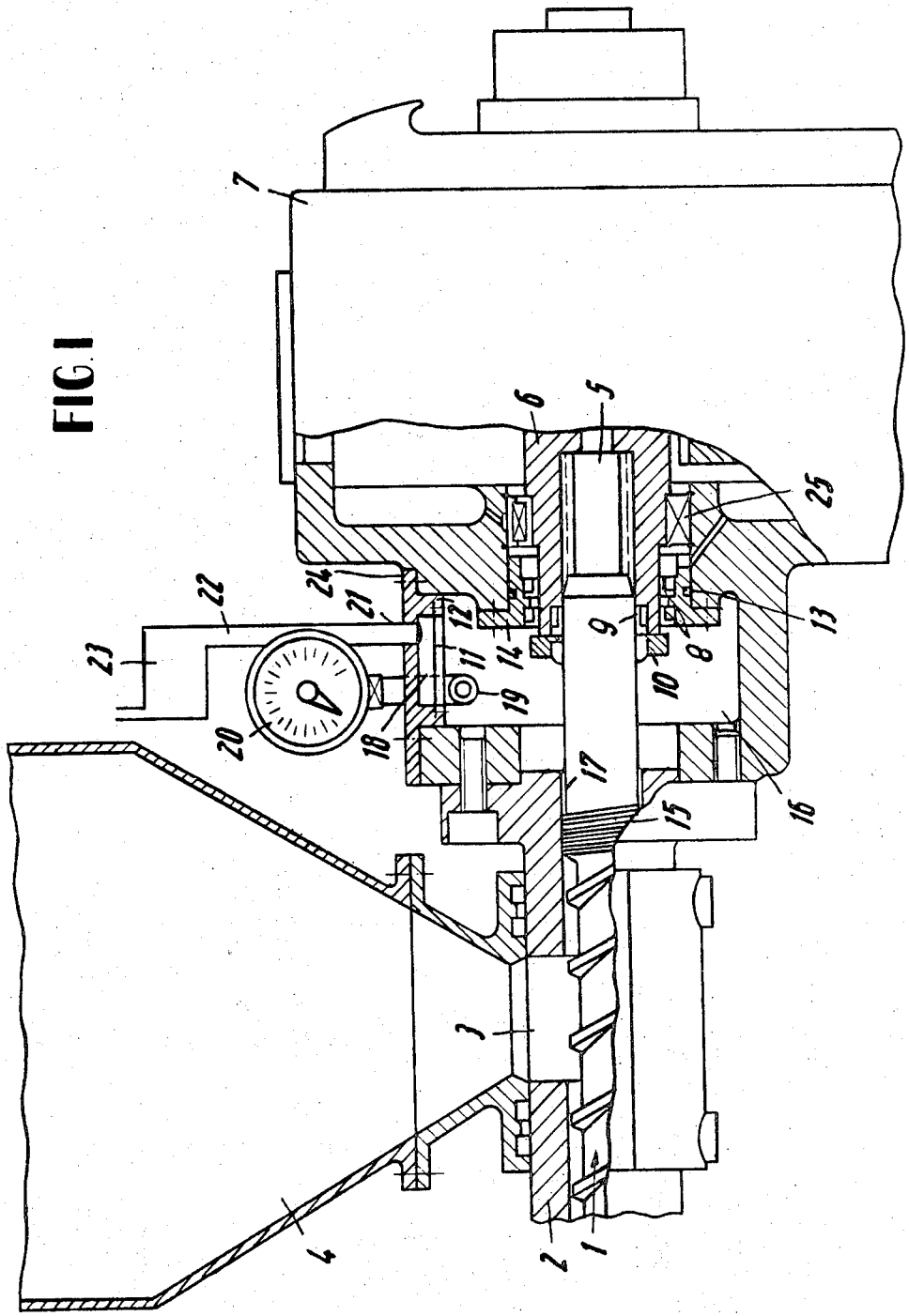
FIG. 1 is a longitudinal vertical sectional view through the apparatus according to the invention showing adaptation for vacuumizing the extruder feed.
Figure 2:
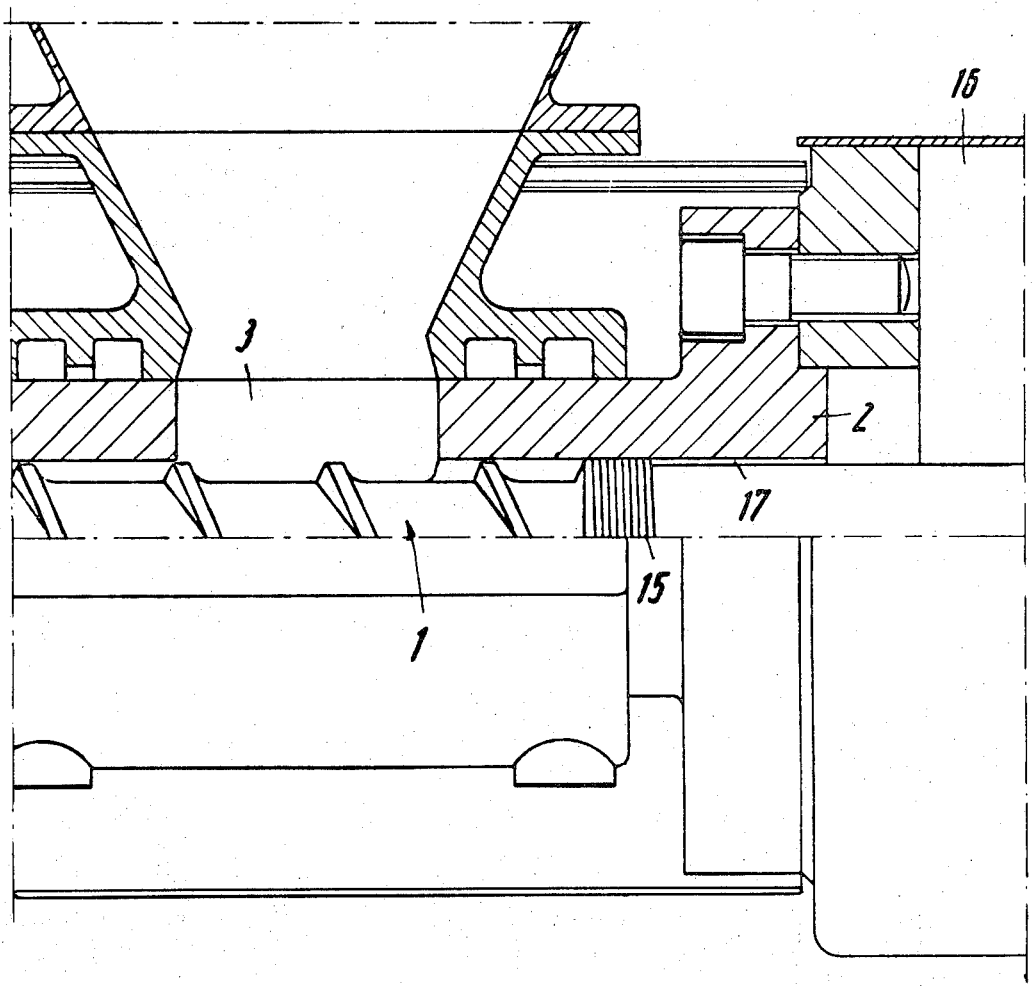
FIG. 2 is an enlarged view of a portion of the apparatus seen in FIG. 1.

Turning now to the drawings and considering first FIGS. 1 and 2, there is shown the extruder screw 1 contained in the cylinder 2 which latter communicates with the hopper 4 through a hopper bore 3. The screw shaft is journaled at 5 in the screw drive 6 of the extruder gear unit enclosed in housing 7, but is detachable therefrom. The seals 8 between the screw driving shaft 6 and the extruder housing 7 assure the vacuum tight sealing of the gear drive (not shown) which is disposed to the right in housing 7. Additional seal 9 is provided between the screw shaft journal 5 and the screw drive 6. Wiper seal lip 10, which is fastened to the screw drive by a screwed-on guard ring 14, serves as protection for the other seals when the screw is removed and replaced. Bearing 25 rotatably supports the screw drive 6.

Between the cylinder 2 and the gear unit (not shown) is an intermediate chamber 16 which is in communication with the cylinder space through an annular clearance 17 where the screw shaft seals of the usual extruder are normally located. Worm gear threads 15 keep away coarse materials from the intermediate chamber 16 and has a certain conveying effect. The intermediate chamber 16 is connected at 19 to a vacuum measuring device 20 and is covered by a vacuum tight lid 24. The lid 24 has on the interior an extension 12 on which a dust filter 11 is clamped. The lid 24 is detachable and can be removed for cleaning the dust filter. The intermediate chamber 16 is separated from a small adjoining chamber 18 by the dust filter 11 and the adjoining chamber 18 is provided with a bore 21 as connection for the suction main 22 to the vacuum pump 23. The dust filter 11 keeps plastic dust and other impurities from the vacuum pump.

The width of the annular clearance 7 is between 1 and 2 mm. However, such a wide clearance is not always required. A clearance of 0.1 to 0.2 mm is sufficient to attain the purpose of the invention. Finally, it should be noted that the hopper 4 is only partly shown in FIG. 1. Normally, hopper 4 is constructed with a relatively small diameter and a larger height. A feed column of 2 to 3 meters is sufficient, especially for fine-granular feeds, to obtain degasification of the material near the area of the lower hopper bore 3 through the intermediate chamber 16 without requiring a cover for the top of the hopper. Coarser feeds may however require a hermetic seal at the top of the hopper.

Considering now FIG. 3, it is observed that the extruder apparatus shown differs from that of FIG. 1 only in that the vacuum gage 20, dust filter 11 and vacuum pump 23 shown in FIG. 1 are not present, and that the main 22 is connected instead to a pressurizing additive feed device 26 which is monitored by a pressure gauge 27.

In the pressurizing form of the invention the plastic to be processed is received by the screw 1 from the hopper 28 through the hopper bore 3 and is mixed with the additive in the region of the hopper bore 3 as it comes from the intermediate chamber 16 via the annular clearance 17 into the cylinder space 29. The invention is particularly advantageous for use with foamable plastic in the extruder in which the foaming agent is conveyed to the plastic via the intermediate chamber under continuous pressure, which is adjustable, and which is higher than the pressure in the annular clearance area 17 of the cylinder chamber.

What is claimed is:

1. In an extruder of the type having an axially rotatable feed screw disposed within a feed cylinder and in which material is fed from a hopper through a hopper opening into the screw cylinder, and having a gear drive unit including a feed screw driving shaft to which the feed screw is detachably coupled and by which it is rotatably driven, the improvement comprising,
    a. a chamber between the end of the feed screw cylinder and the feed screw driving shaft of the gear drive unit,
    b. a gear drive unit feed screw driving shaft having a pressure sealed drive connection presenting into said chamber,
    c. a feed screw in a feed cylinder, said feed screw having a drive end which extends through a portion of said cylinder and through said chamber to a sealed drive connection with the gear unit feed screw driving shaft, said chamber being closed except for communication with the hopper opening through a small annular clearance between the feed screw drive end and the wall of the feed cylinder, and
    d. at least one conduit connection into said chamber from the exterior thereof.

2. An extruder as described in claim 1 wherein the seal of said sealed drive connection between said feed screw drive end and said gear unit feed screw driving shaft is a wiper seal.

3. An extruder as described in claim 1 further including a vacuum pump connected to said at least one conduit connection.

4. An extruder as described in claim 1 further including a vacuum pump connected to said at least one conduit connection into said chamber, and a filter between said vacuum pump inlet and any material drawn through said chamber.

5. An extruder as described in claim 1 further including a vacuum pump connected to said at least one conduit connection, and means coupled to said chamber for measuring the chamber pressure.

6. An extruder as described in claim 1 further including a vacuum pump connected to said at least one conduit connection and a hermetic seal at the hopper top.

7. An extruder as described in claim 1 further including a pressurizing additive feed device connected to said at least one conduit connection.

8. An extruder as described in claim 1 further including a pressurizing additive feed device connected to said at least one conduit connection, and means coupled to said chamber for measuring the chamber pressure.

9. An extruder as described in claim 1 further including a pressurizing additive feed device connected to said at least one conduit connection including means for adjusting the pressure in said chamber to be higher than the pressure in the said annular clearance between said feed screw drive end and the wall of the feed cylinder.

* * * * *